(12) United States Patent
Alsulami et al.

(10) Patent No.: US 11,210,396 B2
(45) Date of Patent: Dec. 28, 2021

(54) LIGHT-WEIGHT BEHAVIORAL MALWARE DETECTION FOR WINDOWS PLATFORMS

(71) Applicant: Drexel University, Philadelphia, PA (US)

(72) Inventors: Bander Mohamed Alsulami, Philadelphia, PA (US); Spiros Mancoridis, Philadelphia, PA (US); Avinash Srinivasan, Lansdale, PA (US)

(73) Assignees: Drexel University, Philadelphia, PA (US); Temple University, Philadelphia, PA (US)

( * ) Notice: Subject to any disclaimer, the term of this patent is extended or adjusted under 35 U.S.C. 154(b) by 19 days.

(21) Appl. No.: 16/112,825

(22) Filed: Aug. 27, 2018

(65) Prior Publication Data

US 2019/0065746 A1 Feb. 28, 2019

Related U.S. Application Data

(60) Provisional application No. 62/550,418, filed on Aug. 25, 2017.

(51) Int. Cl.
*G06F 21/56* (2013.01)
*G06F 16/16* (2019.01)

(52) U.S. Cl.
CPC ............ *G06F 21/566* (2013.01); *G06F 16/16* (2019.01); *G06F 2221/034* (2013.01); *G06F 2221/07* (2013.01); *G06F 2221/2101* (2013.01)

(58) Field of Classification Search
CPC .... G06F 21/566; G06F 16/16; G06F 2221/07; G06F 2221/2101; G06F 2221/034
See application file for complete search history.

(56) References Cited

U.S. PATENT DOCUMENTS

| | | | | |
|---|---|---|---|---|
| 7,712,135 B2* | 5/2010 | Steinberg | ............. | G06F 21/565 713/188 |
| 7,895,448 B1* | 2/2011 | Satish | .................. | G06F 21/577 713/187 |
| 2016/0203316 A1* | 7/2016 | Mace | .................. | G06F 21/316 726/23 |
| 2018/0300482 A1* | 10/2018 | Li | ........................ | G06F 21/565 |

OTHER PUBLICATIONS

"Virus Total," accessed at https://web.archive.org/web/20180824120742/https://www.virustotal.com/#/home/upload, accessed on Jun. 20, 2019, p. 1.
"VirusShare2," accessed at http://www.virusshare.com, accessed on Jun. 20, 2019, p. 1.
Abadi, M., et al., "TensorFlow: A System for Large-Scale Machine Learning," 12th USENIX Symposium on Operating Systems Design and Implementation, vol. 16, pp. 265-283 (2016).

(Continued)

*Primary Examiner* — Mohammed Waliullah
(74) *Attorney, Agent, or Firm* — Schott, P.C.

(57) ABSTRACT

A behavioral malware detection involves extracting features from prefetch files, wherein prefetch files; classifying and detecting benign applications from malicious applications using the features of the prefetch files; and quarantining malicious applications based on the detection.

7 Claims, 5 Drawing Sheets

| | | Prefetch-7 | | Prefetch-10 | |
|---|---|---|---|---|---|
| BoW | TF | TPR | FPR | TPR | FPR |
| 2 | R | 0.997 | $1.2 \times 10^{-3}$ | 1.0 | 0.0 |
| 2 | B | 0.997 | $1.2 \times 10^{-3}$ | 1.0 | 0.0 |
| 3 | R | 0.997 | $1.2 \times 10^{-3}$ | 1.0 | $1.7 \times 10^{-4}$ |
| 3 | B | 0.997 | $1.2 \times 10^{-3}$ | 1.0 | $8 \times 10^{-5}$ |
| 4 | R | 0.996 | $2.4 \times 10^{-3}$ | 0.99 | $2.1 \times 10^{-4}$ |
| 4 | B | 0.996 | $2.4 \times 10^{-3}$ | 0.99 | $1.3 \times 10^{-4}$ |

(56) References Cited

OTHER PUBLICATIONS

Alazab, M., et al., "Zero-day malware detection based on supervised learning algorithms of api call signatures," Proceeding AusDM '11 Proceedings of the Ninth Australasian Data Mining Conference, vol. 121, Australian Computer Society, Inc., pp. 171-182 (2011).
Axelsson, S., "The base-rate fallacy and its implications for the difficulty of intrusion detection," In Proceedings of the 6th ACM Conference on Computer and Communications Security, pp. 1-7 (1999).
Bach, S. H., and Maloof, M. A., "Paired learners for concept drift," 2008 Eighth IEEE International Conference on Data Mining, pp. 23-32 (2008).
Bailey, M., et al., "Automated classification and analysis of internet malware," In International Workshop on Recent Advances in Intrusion Detection, Springer, pp. 178-197 (2007).
Banda, J. M., et al., "Quantitative comparison of linear and non-linear dimensionality reduction techniques for solar image archives," Proceedings of the Twenty-Fifth International Florida Artificial Intelligence Research Society Conference, pp. 376-381 (2012).
Bencsáth, B., et al., "The cousins of stuxnet: Duqu, flame, and gauss," Future Internet, vol. 4, No. 4, pp. 971-1003 (2012).
Borders, K., et al., "Siren: Catching evasive malware (Short Paper)," 2006 IEEE Symposium on Security and Privacy (S&P'06), pp. 1-6 (2006).
Bottou, L., "Large-scale machine learning with stochastic gradient descent," In Proceedings of COMPSTAT'2010, Springer, pp. 177-186 (2010).
Breiman, L., "Random forests," Machine learning, vol. 45, No. 1, pp. 5-32 (2001).
Canto, J., et al., "Large scale malware collection: lessons learned," In IEEE SRDS Workshop on Sharing Field Data and Experiment Measurements on Resilience of Distributed Computing Systems, pp. 6 (2008).
Canzanese, R., et al., "Run-time classification of malicious processes using system call analysis," 2015 10th International Conference on in Malicious and Unwanted Software (MALWARE), pp. 21-28 (2015).
Canzanese, R., et al., "System call-based detection of malicious processes," 2015 IEEE International Conference on Software Quality, Reliability and Security (QRS), pp. 119-124 (2015).
Cavnar, W., "Using an n-gram-based document representation with a vector processing retrieval model," NIST Special Publication SP, pp. 10 (1995).
Chang, C.-C., and Lin, C.-J. "Libsvm: a library for support vector machines," ACM Transactions on Intelligent Systems and Technology (TIST), vol. 2, No. 3, Article 27, (2011).
Chawla, N., "Data mining for imbalanced datasets: An overview," In Data mining and knowledge discovery handbook, Springer, pp. 853-867 (2005).
Christodorescu, M., and Jha, S., "Testing malware detectors," ACM SIGSOFT Software Engineering Notes, vol. 29, No. 4, pp. 34-44 (2004).
Egele, M., et al. "A survey on automated dynamic malware-analysis techniques and tools," ACM Computing Surveys (CSUR), vol. 44, No. 2, Article 6, pp. 49 (2012).
Fawcett, T., "An introduction to ROC analysis," Pattern recognition letters, vol. 27, No. 8, pp. 861-874 (2006).
Fawcett, T., "Roc graphs: Notes and practical considerations for researchers," Machine learning, vol. 31, No. 1, pp. 1-28 (2004).
Filiol, E., "Malware pattern scanning schemes secure against black-box analysis," Journal in Computer Virology, vol. 2, No. 1, pp. 35-50 (2006).
Firdausi, I., et al., "Analysis of machine learning techniques used in behavior-based malware detection," 2010 Second International Conference on Advances in Computing, Control, and Telecommunication Technologies, pp. 201-203 (2010).

Gama, J., et al., "A survey on concept drift adaptation," ACM Computing Surveys (CSUR), vol. 46, No. 4, Article No. 44, p. 44 (2014).
Gao, D., et al., "On gray-box program tracking for anomaly detection," Proceeding SSYM'04 Proceedings of the 13th conference on USENIX Security, pp. 103-118 (2004).
Golub, G. H., and Reinsch, C., "Singular value decomposition and least squares solutions," Numerische mathematik, vol. 14, No. 5, pp. 403-420 (1970).
Gostev, A., et al., "Kaspersky security bulletin, malware evolution 2010," Kaspersky Lab, accessed at https://securelist.com/kaspersky-security-bulletin-malware-evolution-2010/36343/, accessed on May 12, 2019, pp. 20.
Graves, A., and Schmidhuber, J., "Framewise phoneme classification with bidirectional LSTM and other neural network architectures," Neural Networks, vol. 18, No. 5, pp. 602-610 (2005).
Gu, G., et al., "BotHunter: Detecting malware infection through ids-driven dialog correlation," In Usenix Security (2007), vol. 7, pp. 1-16 (2007).
Halko, N., et al., "Finding structure with randomness: Probabilistic algorithms for constructing approximate matrix decompositions," SIAM Review, vol. 53, No. 2, pp. 217-288 (2011).
He, H., and Garcia, E., "Learning from imbalanced data," IEEE Transactions on Knowledge and Data Engineering, vol. 21, No. 9, pp. 1263-1284 (Sep. 2009).
Heller, K., et al., "One class support vector machines for detecting anomalous windows registry accesses," In Workshop on Data Mining for Computer Security (DMSEC), Melbourne, FL, pp. 2-9 (2003).
Hofmeyr, S. A., et al., "Intrusion detection using sequences of system calls," Journal of computer security, vol. 6, No. 3, pp. 151-180 (1998).
Ilgun, K., et al., "State transition analysis: A rule-based intrusion detection approach," IEEE Transactions on Software Engineering, vol. 21, No. 3, pp. 181-199 (1995).
Jacob, G., et al., "Behavioral detection of malware: from a survey towards an established taxonomy," Journal in computer Virology, vol. 4, No. 3, pp. 251-266 (2008).
Joachims, T., "Learning to classify text using support vector machines: Methods, theory and algorithms," Kluwer Academic Publishers, Computational Linguistics, vol. 29, No. pp. 1-10 (2002).
Kang, D.-K., et al., "Learning classifiers for misuse and anomaly detection using a bag of system calls representation," Proceedings from the Sixth Annual IEEE SMC Information Assurance Workshop, pp. 118-125 (2005).
Kantchelian, A., et al., "Approaches to adversarial drift," In Proceedings of the 2013 ACM workshop on Artificial intelligence and security (2013), ACM, pp. 99-110 (2013).
Kantchelian, A., et al., "Better malware ground truth: Techniques for weighting anti-virus vendor labels," In Proceedings of the 8th ACM Workshop on Artificial Intelligence and Security, In Proceedings of the 8th ACM Workshop on Artificial Intelligence and Security, pp. 45-56 (2015).
Kayacik, H. G., and Zincir-Heywood, A. N., "Mimicry attacks demystified: What can attackers do to evade detection?" 2008 Sixth Annual Conference on Privacy, Security and Trust, pp. 213-223 (2008).
Kayacik, H. G., et al., "Generating mimicry attacks using genetic programming: a benchmarking study," 2009 IEEE Symposium on Computational Intelligence in Cyber Security, pp. 136-143 (2009).
Kim, H., et al., "Dimension reduction in text classification with support vector machines," In Journal of Machine Learning Research, pp. 37-53 (2005).
Kim, Y., "Convolutional neural networks for sentence classification," arXiv preprint arXiv:1408.5882, pp. 6 (2014).
Kolter, J.Z., and Maloof, M.A., "Learning to detect and classify malicious executables in the wild," Journal of Machine Learning Research, vol. 7, pp. 2721-2744 (2006).
Kruegel, C., et al., "Polymorphic worm detection using structural information of executables," In International Workshop on Recent Advances in Intrusion Detection, pp. 207-226 (2005).

(56) References Cited

OTHER PUBLICATIONS

Lane, T., and Brodley, C. E., "Approaches to online learning and concept drift for user identification in computer security," In KDD (1998), pp. 259-263 (1998).

Lee, W., et al., "A data mining framework for building intrusion detection models," Proceedings of the 1999 IEEE Symposium on Security and Privacy, pp. 120-132 (1999).

Leskovec, J., et al., "Mining of massive datasets," Cambridge University Press, pp. 513 (2014).

Li, P., et al., "On challenges in evaluating malware clustering," In International Workshop on Recent Advances in Intrusion Detection, pp. 238-255 (2010).

\* cited by examiner

| Malware Type | Size | Malware Family |
|---|---|---|
| Adware | 573 | EoRezo, Firseria, IBryte, MultiPlug, Nsis, Kranet, PullUpdate |
| Backdoor | 10 | Advml, Fynloski, Cycbot, BackDoor2 |
| Trojan | 690 | TrojanDownloader, TrojanDropper, InstalleRex, Kazy, Muldrop, Swizzor, TrojWare, Hlux, VBInj, Kryptik |
| Virus | 55 | Sality, Bandoo, Smshoax, Oxypumper, DomaIQ, MalSign |
| Worm | 28 | Downadup, WormDropper, Kargo |

FIG. 1

| BoW | TF | Prefetch-7 | | Prefetch-10 | |
|---|---|---|---|---|---|
| | | TPR | FPR | TPR | FPR |
| 2 | R | 0.997 | $1.2 \times 10^{-3}$ | 1.0 | 0.0 |
| | B | 0.997 | $1.2 \times 10^{-3}$ | 1.0 | 0.0 |
| 3 | R | 0.997 | $1.2 \times 10^{-3}$ | 1.0 | $1.7 \times 10^{-4}$ |
| | B | 0.997 | $1.2 \times 10^{-3}$ | 1.0 | $8 \times 10^{-5}$ |
| 4 | R | 0.996 | $2.4 \times 10^{-3}$ | 0.99 | $2.1 \times 10^{-4}$ |
| | B | 0.996 | $2.4 \times 10^{-3}$ | 0.99 | $1.3 \times 10^{-4}$ |

FIG. 2

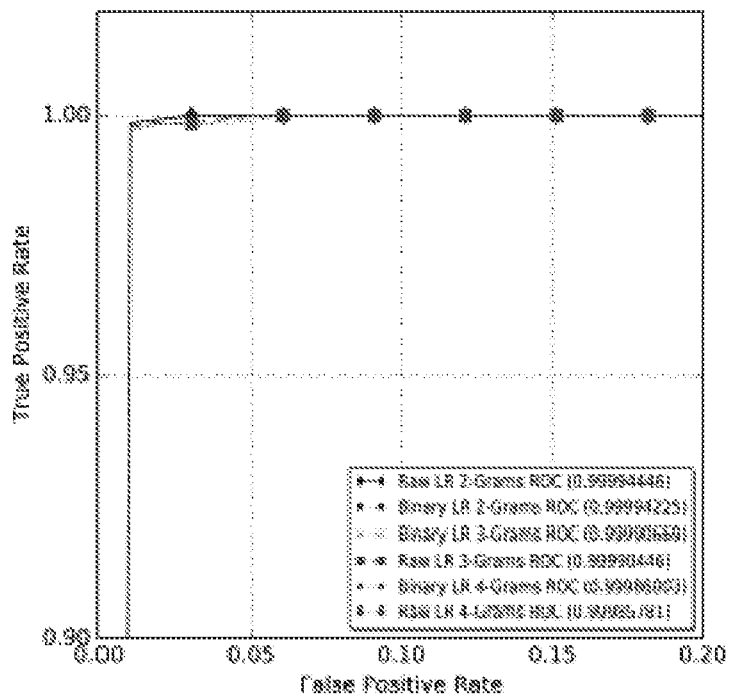
FIG. 3(a) Prefetch-7
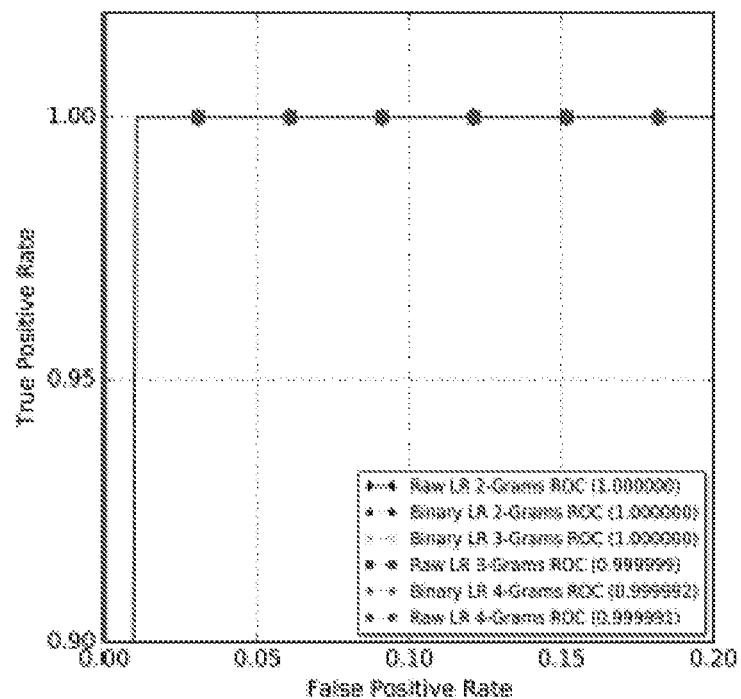
FIG. 3(b) Prefetch-10

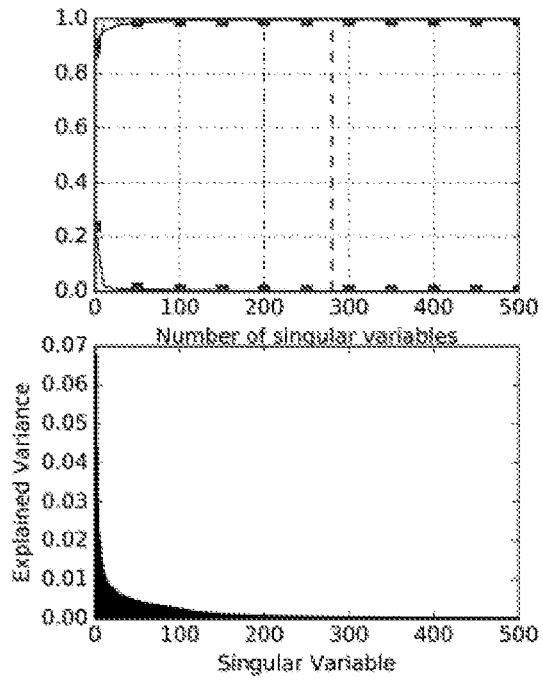
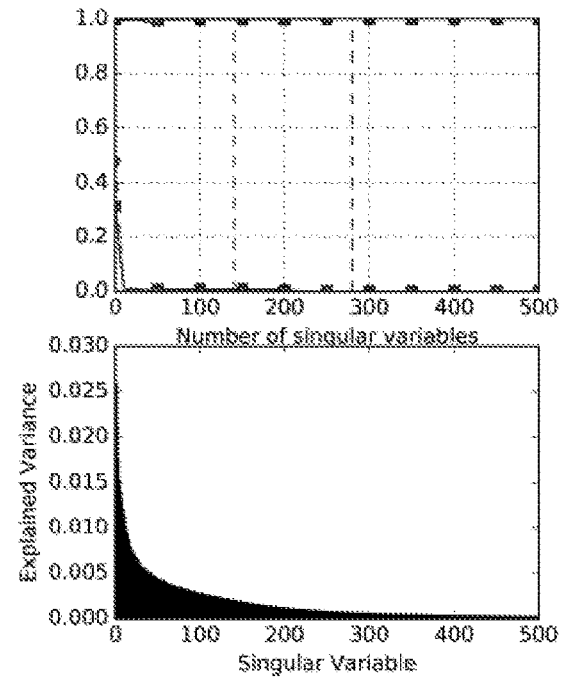
FIG. 4(a) Prefetch-7 dataset                FIG. 4(b) Prefetch-10 dataset
| | | Prefetch-7 | | |
|---|---|---|---|---|
| Classifier | BoW | TPR | FPR | AUC |
| SVM | 3 | 0.97 | $5.2 \times 10^{-2}$ | 0.991 |
|  | 4 | 0.97 | $5.7 \times 10^{-2}$ | 0.985 |
| LR | 2 | 0.997 | $1.2 \times 10^{-3}$ | 0.999 |
|  | 3 | 0.997 | $1.2 \times 10^{-3}$ | 0.999 |
| | | Prefetch-10 | | |
| Classifier | BoW | TPR | FPR | AUC |
| SVM | 3 | 0.996 | $1.09 \times 10^{-3}$ | 0.998 |
|  | 4 | 0.995 | $2.35 \times 10^{-3}$ | 0.998 |
| LR | 2 | 1.0 | 0.0 | 1.0 |
|  | 3 | 1.0 | $8.4 \times 10^{-3}$ | 1.0 |
FIG. 5

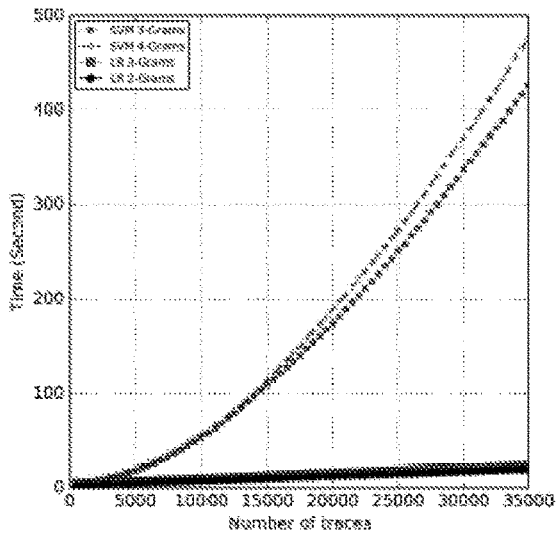
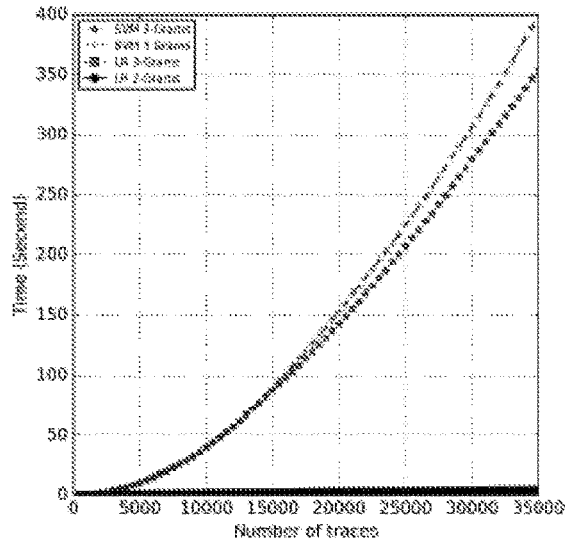
FIG. 6(a) Training Time     FIG. 6(b) Evaluation Time
| Detector | Prefetch-7 | |
|---|---|---|
| | TPR | FPR |
| 2-Grams LR | 0.9033(-0.096) | 0.0673(+0.064) |
| 3-Grams LR | 0.9306(-0.066) | 0.0770(+0.074) |
| Detector | Prefetch-10 | |
| | TPR | FPR |
| 2-Grams LR | 0.9919(-0.008) | 0.0074(+0.007) |
| 3-Grams LR | 0.9911(-0.009) | 0.0062(+0.006) |
FIG. 7

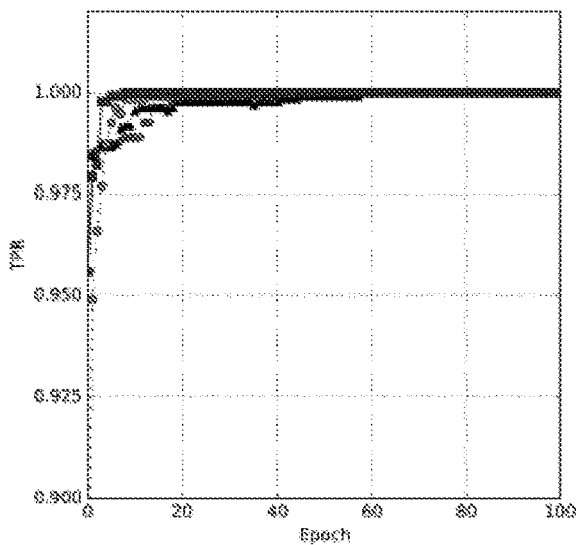
FIG. 8(a) TPR on Prefetch-10 dataset
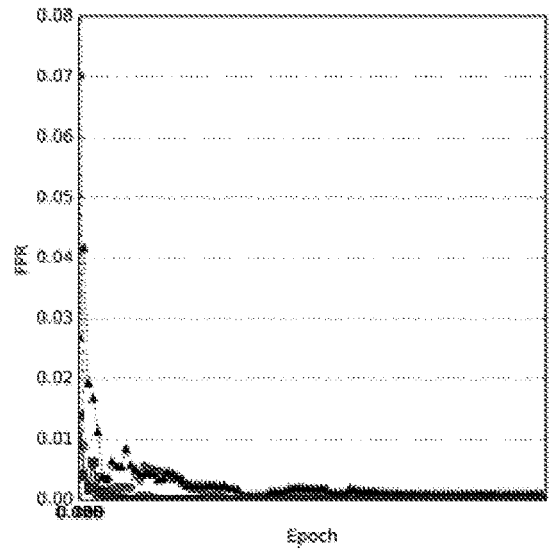
FIG. 8(b) FPR on Prefetch-10 dataset
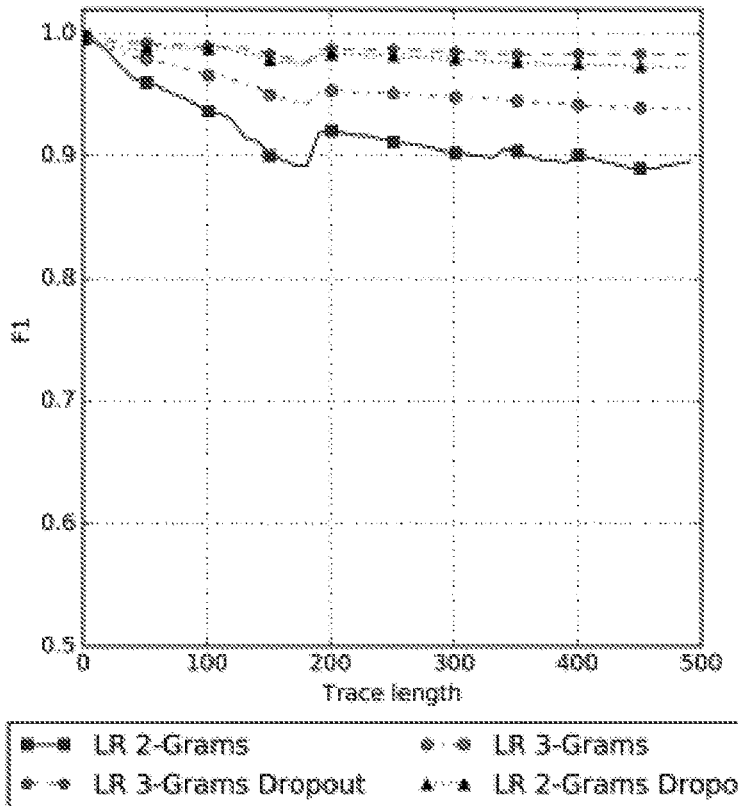
FIG. 9

LIGHT-WEIGHT BEHAVIORAL MALWARE DETECTION FOR WINDOWS PLATFORMS

BACKGROUND

1. Windows® Prefetch Background

Prefetch files date back to the Windows® XP operating system. Prefetching was introduced to speed up the booting process and launch time of applications. Prefetching has also been extended in Windows® Vista by SuperFetch. SuperFetch attempts to accelerate application launch times by monitoring and adapting to applications' usage patterns over time. SuperFetch caches the majority of the files and data needed by the applications in advance, so that they can be accessible quickly later. The prefetching process occurs when the Windows® Cache Manager (WCM) monitors certain elements of data that are extracted from the disk into memory by processes. This monitoring occurs during the first two minutes of the booting process, and for another sixty seconds after all the system services are loaded. Similarly, after an application is executed, the WCM monitors the first ten seconds. WCM stores dependency files for each application in files with .PF extensions inside a system folder called Prefetch. For instance, when a user executes an application such as Notepad, the system generates the application prefetch file name and look in the prefetch folder for a match. If the lookup results in a match, the WCM notifies the operating system to read the Notepad prefetch file and open directories or files referenced in that prefetch file. Otherwise, a new prefetch file is created for that application.

Prefetch files store valuable information about the behavior of applications, which can be used for memory security forensics, system resources auditing, and Rootkit detection. Many malicious activities can leave distinguishable traces in prefetch files. Even fileless malware, which are memory resident malicious programs, can leave residual trails in prefetch files after deleting their presence from the file system. Poweliks is one of the first fileless malware that can infect a computer with Ransomware. The malware applies several evasion techniques to avoid detection from traditional anti-virus software. Fileless malware are notorious for their ability to remain hidden and persist for long periods in the memory of infected systems.

SUMMARY OF THE EMBODIMENTS

A behavioral malware detection involves extracting features from prefetch files, wherein prefetch files; classifying and detecting benign applications from malicious applications using the features of the prefetch files; and quarantining malicious applications based on the detection.

BRIEF DESCRIPTION OF THE DRAWINGS

FIG. 1 is a table showing malware types, each type size, and samples of malware families according to Eset-Node32, kaspersky, and Symantec engines.

FIG. 2 is a table showing TPR, FPR, and AUC scores for Raw and Binary feature extraction techniques on Prefetch-7 and Prefetch-10 datasets.

FIGS. 3a and 3b show ROC curves for raw and binary [2,3,4]-Grams LR detectors.

FIGS. 4a and 4b show the effect of the number of singular variables on the on TPR and FPR, and the EV for each singular variable, respectively.

FIG. 5 is a table showing TPR, FPR, and AUC for [2,3]-Grams LR and [3,4] SVM detectors.

FIGS. 6(a) and 6(b) show the training and evaluation run-times for malware detectors on the Prefetch-10 dataset with random oversampling.

FIG. 7 is a table showing the loss in TPR and FPR when the detector is evaluated on a different Windows® platform than the platform it was trained on.

FIGS. 8(a) and 8(b) shows the TPR and FPR for newly trained and retrained [2,3]-Grams LR detectors.

FIG. 9 shows F1 for [2,3]-Grams LR detectors trained with and without Dropout.

DETAILED DESCRIPTION OF THE EMBODIMENTS

2. Introduction

Static signature-based malware detection methods use static properties of programs to discriminate between the benign and malicious programs. Static signature-based malware detection needs to examine the malware and create a distinct signature for each newly discovered malware. A signature may be based on a byte-code sequence, binary assembly instruction, an imported Dynamic Link Library (DLL), or function and system calls. Unfortunately, malware authors use various obfuscation techniques to generate new variants of the same malware. Therefore, the number of signatures grows rapidly as well as the time takes to analyze and create each signature. This endangers critical systems and increases the spread of malware infection.

Despite the large number of malware variants, the original malware tend to exhibit the same execution behavior, as static obfuscation techniques often do not change the behavior of the malware. Therefore, examining the dynamic properties of the malware is more reliable than examining easily obfuscated static properties. Behavioral malware detection techniques use features that represent the behavior of the malware. Therefore, behavioral malware detection can detect malware variants that are missed by static signature-based malware detection. Unfortunately, extracting an informative dynamic properties from a process behavior is complicated. The development environment needs to replicate the right conditions to execute malware. The environment needs to have the same set of configurations (i.e., the specific vulnerability type in the application, the same version of the operating system) to activate the malicious behavior of the malware. Malware also have different behaviors that depend on the conditions of the infected machine.

As discussed herein, the concept of prefetching may be expanded from its use in the conventional realm. The traditional concept can be seen on platforms running the Windows® operating system starting with Windows® XP. The objective of prefetching is to make resources available to the processor before an explicit request. This involves analyzing and predicting the behavior of programs running on Windows® platforms. Prefetch files have drawn attention from the computer forensics community and law enforcement agencies. No prior work in malware detection, however, has investigated the usage of prefetch files as dynamic features for behavioral malware detection.

Benign applications and the Windows® operating system change over time through gradual updates. Behavioral malware detection techniques need to be responsive to changes in the systems and adapt accordingly to provide accurate detection. Malware also evolve their behavior to evade detection and exploit different vulnerabilities in the target platforms. Therefore, malware detection needs to remain effective to the future permutation in the malware families. However, behavioral malware detection makes the obfuscation process harder for malware authors, causing malware authors to imitate the behavior of the benign programs while executing the malicious functions stealthy. Behavioral malware detection needs to be resilient to such countermeasures.

3. Malware Detection Framework

The malware detector herein discriminates between normal and malicious Windows® applications using prefetch files found in the Windows® Prefetch folder. It may use machine learning techniques to implement the components of the detector. This section describes the five major components of the malware detector: Feature Extraction, Feature Scaling and Transformation, Dimensionality Reduction, and Detection Classifier.

3.1 Feature Extraction

The malware detector may use a Bag of Words (BoW) model to represent the list of dependency file names in a prefetch file. BoW models are used extensively in document classification and natural language processing where each document is represented by a vector of the frequencies of all words occurring in the document. In a test case, each trace may be viewed as a sequence of n-grams. An n-gram is a sequence of n adjacent dependency file names.

BoW may support two different Term Frequency (TF) representations: binary and raw. In the binary frequency representation, an n-gram has the frequency 1 if it appears anywhere in the trace and 0 if does not appear in the trace. In the raw frequency representation, an n-gram's frequency is the exact number of times it appears in the trace.

For binary and raw TFs, each trace is represented by a column vector of length l, where l is the total number of all possible n-grams. That is, for a trace of 100 unique file names, there are 100n distinct n-grams. Only present n-grams are included in the feature vectors, however, whereas the rest are ignored. Accordingly, a trace with a length t is less than or equal the length of the column vector.

$$t \leq l. \tag{1}$$

This allows representing feature vectors using sparse vector representations. A sparse vector stores only non-zero values, which reduces the storage requirement and improves the computation performance of the algorithms. For convenience, we will refer to the n-gram traces of the dependency file names herein as feature vectors.

3.2 Feature Scaling and Transformation

After the feature vectors are extracted, A Term Frequency-Inverse Document Frequency (TF-IDF) transformation may be applied. The TF-IDF is a technique that highlights important n-grams in feature vectors. Rare n-grams receive a higher weight than the common n-grams across all feature vectors.

The TF-IDF transformation is given by the following formulas:

$$tf\text{-}idf(x) = tf(x) \cdot (idf(x,X) + 1) \tag{2}$$

$$tf(x) = 1 + \log(x) \tag{3}$$

$$idf(x,X) = \log((X+1)/(TRACE(x)+1)) \tag{4}$$

where x is an n-gram, and X is the matrix that contains all n-grams in the feature vectors. In Eq. (3), tf uses a logarithmic scaled frequency, which is useful when the n-gram frequencies vary by a large quantity. In Eq. (4), TRACE is a function that returns a frequency value. In the case of using the raw frequency representation, the function returns the total number of traces where x appears. In case of a binary frequency representation, TRACE returns 1. Additive smoothing is also applied in Eq. (2) to assign a non-zero frequency to all n-grams to prevent a division to be zero.

3.3 Dimensionality Reduction

N-gram models have a high-dimensional feature space, which may be computationally intractable. Dimensionality reduction techniques can be used to transform the data into a useful lower dimensional representation while retaining a high variance of the original data. While reduction techniques can be linear or non-linear, the linear reduction techniques may provide stable results over a high number of dimensions and thus, the malware detector described herein contemplates, without limitation, a linear dimensionality reduction technique called Singular Value Decomposition.

Singular Value Decomposition (SVD) is a linear dimensionality reduction technique that extracts the singular values of feature vectors. Singular values are the non-negative square roots of eigenvalues. The detector herein may use a variant of SVD known as fast randomized truncated SVD. A truncated SVD computes only the r largest singular values, which is computationally efficient for large matrices. Additionally, the randomization technique improves the accuracy, speed, and robustness of the reduction.

In contrast to many linear reduction techniques, truncated SVD does not require computing the covariance matrix which is an expensive operation for large matrices. This allows SVD to work directly on sparse matrices without breaking the sparsity of the feature vectors. Therefore, it is an efficient reduction technique for large high-dimensional sparse matrices.

3.4 Detection Classifier

Malware detection can be defined as a binary classification problem. That is, the training data is sampled from two classes: the benign and malicious classes. Therefore, we use a Logistic Regression (LR) classifier for class prediction. LR is suitable for machine learning problems with binary classes. LR is a Generalized Linear Regression (GLM) with a non-linear function called sigmoid, also known as the logistic function. The final form of the classifier is:

$$p(y = 1 \mid x; \theta) = \frac{1}{1 + e^{\theta^T x}} \tag{5}$$

where q are learnable parameters, x is a feature vector, and y is the class label. LR is a probabilistic classifier that output probability values. A sigmoid function maps the output of the linear function into range. A probabilistic classifier is an advantage for malware detection because it simplifies setting the threshold. The default setting for LR threshold is 0.5. However, the threshold may be changed to maximize the detection rate.

Stochastic Gradient Descent (SGD) is used to train a LR classifier. SGD is an iterative optimization algorithm commonly used in training neural networks. SGD computes the gradient (N) of the parameters (q) with respect to each trace in the training set Traces are randomly chosen during each iteration (t). After computing the gradient, the parameters may be updated in the direction of the negative gradient Given n training traces, the update rule is:

$$\theta_{i+1} = \theta_i - n_t \nabla l(x_{i(t)}, y_{i(t)}; \theta_t) - n_i \cdot \nabla r(\theta_t) \tag{5a}$$

where i is the index of the trace from the training set $\{1, 2, 3, 4 \ldots n\}$. The learning rate r represents the size of step for SGD. For LR, SGD minimizes the loss of the cross-entropy error function:

$$-\sum_{i,n} (t_n \log y_n + (1 - t_n)\log(1 - y_n)) \quad (6)$$

where to represents the prediction value, and yn represents the actual label value. SGD may operate on large training sets using one trace at a time. Thus, it is efficient for large training sets and online training.

4. Experimental Setup

This section describes an experimental setup undertaken to test the malware detector, the collected datasets, and the ground truth labeling used to evaluate the malware detector.

4.1 Dataset Collection

To evaluate the malware detector, an experiment on two different Windows® platforms was conducted. Each platform generated a separate dataset that included prefetch files samples for benign and malware programs. In the first dataset, the prefetch files were collected from the Windows® 7 platform and name the dataset as Prefetch-7. The second dataset was named Prefetch-10 and included prefetch files from Windows® 10.

It should be understood that in actual practice for building an adaptable machine-learning system based on the discussion herein, the system would learn to identify markers in malware-created prefetch files by reviewing those prefetch files after malware execution. Such prefetch files often will survive a later deletion of the malware, and thus serve as a better source for malware detection than other files and markers. Further, the low overhead used in reviewing prefetch files makes the system herein a more resource friendly system, as discussed later.

The distribution of benign files varied between the two datasets due to the different number of installed applications and system services on each platform. Prefetch-10 contained 23,848 benign prefetch files, while Prefetch-7 had 1,663 benign files. For Windows® to generate a prefetch file for an individual program, the program needed to be requested from the operating system. Once a program is loaded, Windows® generated a prefetch file automatically.

For malware samples, 1,900 malware executable files were collected from the public malware repository VirusShare1. The viruses were deployed on each Windows® platform, and their respective prefetch files were collected. In this experiment, malware that produce prefetch files and had been identified by anti-virus engines. Were collected, therefore, only 1,356 malware files were included in this experiment.

4.2 Ground Truth

Ground truth labels for malware were obtained through an online third-party virus scanning service. In this experiment, VirusTotal3 was used. Given an MDS, SHA1 or SHA256 of a malware file, VirusTotal provided the detection information for popular anti-virus engines. This information also included target platforms, malware types, and malware families. Malware that are not identified by any anti-virus detection engine was excluded.

The malware samples were collected from different malware families. FIG. 1 shows samples of malware families. Due to the disparity among anti-virus engines for malware family names, Eset-Node32, Kaspersky, and Symantec engines were selected to show malware variants in the datasets. Group malware samples were organized into five generic groups: Adware, Backdoor, Trojan, Worm, and Virus. The most likely type of each malware was selected based on the level of agreement between all the classifications of the three anti-virus engines.

5. Malware Framework Evaluation and Results

In this section the major components of the malware detection framework were evaluated.

5.1 Performance Measurements

The detection accuracy was measured by Receiver Operating Characteristics (ROC) curves [19, 29, 20], that is, calculating the detection rate as a function of the false alarm rate. The Detection rate represents the fraction of predicting a malicious trace as malicious. The false alarm rate represents the fraction of falsely predicting a benign trace as malicious.

Detection rate and false alarm rate are also called True Positive Rate (TPR) and False Positive Rate (FPR), respectively. The formulas for TPR and FPR are the following:

$$TPR = \frac{\text{True Positive}}{\text{True Positive} + \text{False Negative}} \quad (6a, 6b)$$

$$FPR = \frac{\text{False Positive}}{\text{False Positive} + \text{True Negative}}$$

ROC curves demonstrate the tradeoff between TPR and FPR. A malware detector can be thought of as superior when its ROC curve is always higher than curves of other detectors. To simplify the comparison, the Area Under Curve (AUC) of each ROC curve was used. AUC is the area of unit square under the ROC curve with value range from 0.0 to 1.0. A malware detection with a higher AUC value, in general, has a higher TPR at lower FPR. However, ROC curves may cross at some areas, which complicate the evaluation.

These metrics is that they may be less prone to unbalanced training data. Malware detection experiments may suffer from unbalanced samples in favor of benign applications. In the experiments, Prefetch-7 included more benign samples than malware samples by a small margin. There are 307 more samples in the benign class than in the malware class. Prefetch-10 included more benign samples than malware samples by a large margin. There was 18:1 ratio of benign to malware samples.

5.2 Feature Analysis

To find the best combination of the feature extraction techniques the malware detector was evaluated using the following parameters:

Bag of Words (BoW): 2-Grams, 3-Grams, and 4-Grams.
Term Frequency (TF): Raw (R) and Binary (B).

Smooth TF-IDF transformation, and logarithmic scale were applied to parameters during the experiment. The goal was to find the best set of parameters that improve the performance of the malware detector on the Prefetch-7 and Prefetch-10 datasets. TPR, FPR, and ROC metrics were used to compare the performances.

FIGS. 3a and 3b show the top left corner of the ROC curves of the detectors on both Prefetch-7 and Prefetch-10. As shown, binary and raw 2-Grams detectors were superior to all 3-Grams and 4-Grams detectors. Binary and raw 3-Grams detectors were superior to all 4-Grams detectors. Therefore, higher order n-grams provide no additional gain in performance. Using [2,3]-Grams were sufficient to achieve a high TDR and a lower FDR. Moreover, [2,3]-Grams detectors used a smaller feature space 4-Grams detectors.

FIG. 5 details the TPR and FPR for all the detectors. Detectors with binary TF were usually superior to detectors with raw TF. The On the Prefetch-7 dataset, the detectors achieved around $1\times10^{-3}$ FPR on a TPR as high as 0.99. On Prefetch-10, the detectors with binary TF achieved lower FPRs on high TPRs. Higher order n-grams than 3-Grams did not provide extra benefits. Therefore, the experiment was continued with binary 2-Grams and 3-Grams.

5.3 Dimensionality Reduction

Dimensionality reduction was used to control the complexity of the model and reduce the computational and storage requirements of the malware detector. The number of reserved singular variables in the truncated SVD controls the dimensionality size of the models. The largest singular variables contain the most variance in the data. Removing the smaller singular variables, therefore, will result in a minimal loss of information. To find the appropriate number of singular variables, the Explained Variance as a metric was used. The Explained Variance (EV) is the ratio of the variance of projected vectors to the original feature vectors. If the ratio is high, most of the variance is preserved in the projected new dimensions. FIGS. 4(a) and 4(b) show the EV for each singular variable in both the Prefetch-7 and Prefetch-10 datasets. The goal was to find the smallest subset of singular variables that yields the highest EV. Thus, discarding the rest of the singular variables may result in an insignificant performance downgrade.

The goal was to preserve the minimum number of singular variables that maximize the difference between TPR and FPR. As shown in FIG. 4, the vertical lines indicate the smallest subsets of singular variables that achieved the largest difference. The result in (a) shows that the minimum number of singular variables needed is between 200-300 variables for the Prefetch-7 dataset. The largest 300 singular variables hold most of the variations in the feature vectors. For the Prefetch-10 dataset in (b), the minimum number of singular variables is between 150-300 variables. Therefore, to improve the generalization of the malware detector, 300 was selected as an empirically ideal number for the number of singular variables for the malware detector.

5.4 Detection Performance

To show the effectiveness of the malware detector on the prefetch datasets, we compare the LR detectors to Support Vector Machine (SVM) detectors [2]. SVM have established state-of-the-art results in multiple malware detection and classification research [81, 57, 43, 21, 12]. We compare the [2,3]-Grams LR detectors to the best SVM detectors from [12]. We use 10-fold crossvalidation with stratified sampling to create a balanced distribution of benign and malware samples in each fold.

FIG. 5 shows the TPR, FPR, and AUC metrics for [2,3]-Grams LR and [3,4]-Grams SVM detectors. On the Prefetch-7 dataset, [2,3]-Grams LR detectors achieved as high as 0.997 TPR on $1.2 \times 10^{-3}$ FPR. SVM detectors achieved a lower TPR at a higher FPR. On the Prefetch-10 dataset, [2,3]-Grams LR detectors achieved 1.0 TPR and zero to $8.4 \times 10^{-5}$ FPR, which is the ideal FPR for practical malware detection. This experiment showed that LR detectors are superior to SVM detectors on prefetch datasets.

5.5 Run-Time Performance

The malware detector may scale to large data without affecting its run-time performance. This subsection compares the training time and evaluation time of the LR malware detector to SVM malware detectors. SVM uses Sequential Minimal Optimization (SMO) to solve a quadratic programming (QP) optimization problem. The quadratic programming problem may be divided into smaller QP problems that are manageable to solve. Therefore, the optimization problem becomes quadratic instead of cubic. This experiment measured the run-time performance for SVM detectors that are optimized using SMO. The LR and SVM detectors were implemented using Scikit-learn framework and LibSVM library.

The detectors' performance on the Prefetch-10 dataset was evaluated and the dataset had a large number of traces to demonstrate the growth in running time for the training and evaluation processes. In the training process, the detector was trained on the benign and malicious traces. In the evaluation process, the detector decided whether a trace is malicious or benign. To evaluate the run-time for the detectors on both processes, first 500 samples were selected from both malware and benign traces. The time detectors spend on training and evaluation processes were measured then the sample size was increased by another 500 and the timing recorded. The process repeated until it reached 35,000 samples. Since the ratio between benign and malware traces was unbalanced, it used a randomized oversampling technique to increase the malware traces in the training and evaluation.

FIG. 6 shows run-time performance for LR [2,3]Grams LR, and [3,4]-Grams SVM detectors during the training and evaluation processes. The run-time of SVM detectors grows quadratically with the number of the traces. On the contrary, LR detectors maintained a linear growth on a large number of traces. Therefore, LR detectors, trained using SGD, are scalable and practical to a large number of traces. SVM may also be trained using SGD. SGD works by minimizing the error given by the hinge loss function. The hinge loss function is a maximum margin classification function. Therefore, the run-time performance for SVM, trained on SGD, may be similar to LR detector since they are using the same optimization algorithm for training.

6. Detector Adaptation

Malware detectors that do not adapt adequately to the new changes in the platforms may become inconsistent and ineffective over time. The change in programs behavior over time may be called Concept Drift, which is not only limited to changes in the benign programs, malware families also evolve their behavior over time to avoid detection.

This section considers the adaptation of the malware detector to changes in platforms, which occurs when the detector is deployed to a different Windows® platform or when the same Windows® platform changes over time. A solution may be proposed herein.

6.1 Drift Evaluation

To measure the degree of drift in the malware detector's performance on new Windows® platforms or when the same platform changes, the malware detectors on Prefetch-7 may be trained and evaluated on Prefetch-10, and vice-versa.

FIG. 7 shows the TPR and FPR when the detector is trained on one Windows® platform and evaluated on a different one. The loss in TPR across the datasets was less than $1 \times 10^{-1}$. Moreover, the increase in FPR was no more than $1 \times 10^{-1}$. The loss in performance may be accounted because of the different configuration sets in the Windows® platforms, newly installed programs, and different cache entries in the Windows® Prefetch folder since the folder is updated regularly.

6.2 Learning Adaptation

Malware detectors adapt to new changes using two techniques: Retraining the detectors on the new platform and removing the past learned information, or incremental training on the new information. Retraining the detector requires reserving the past training data and combining it with the new information. Therefore, training time should be minimal to prevent impacting the overall system performance. This technique, however, is not effective on dynamic systems that are frequently changing. Moreover, malware detection may need to include new malware families as they are continuously discovered. On the other hand, incremental training provides a practical solution to assimilate new information into the detector without impacting the performance.

While training the malware detectors from scratch is fast, incremental training to measure the training time required to improve the detector when the detection accuracy drops may be studied. The detection accuracy of the incrementally trained detector to the newly trained detector may be compared. FIGS. 8(a) and 8(b) show the TPR/FPR over the course of the training process where four different versions of the malware detector were selected: New [2,3]-Grams LR, and trained [2,3]-Grams LR. The trained detectors were pre-trained on the Prefetch-7 dataset. The Prefetch-7 dataset represents the old state of the platform, while the Prefetch-10 dataset represents the new state. The detectors on Prefetch-10 were trained to represent the new changes in the platform and the TPR and FPR after each epoch until 100 epochs were recorded.

The experiment shows that the retrained detectors achieve a higher TPR and a lower FPR more quickly than the newly training detectors. In fact, the training process can be stopped early for retrained detectors, which is an advantage. Therefore, incremental training for the malware detector is efficient and recommended over fully retraining.

7. Detecting Malware Evasion

Modern malware often use obfuscation techniques such as polymorphism and metaphorsism to evade traditional static signature-based malware detection. Behavioral malware detections, however, are often more resilient to static obfuscation methods since they observe the behavior of the original malware. A common evasive technique, called Mimicry Attack, has shown success in evading behavioral malware detection and evasive malware mimics the behavior of a benign program to evade being detected. The attack can be designed manually through analyzing the internal mechanism of the malware detector or it can consider the malware detector as a black box and generate the mimic attacks automatically using trial and error or genetic programming. Mimicry attacks pose a real threat to the development of malware detection. Malicious programs can be executed without being noticed or detected. For an example, a malware may load some benign dependency files in the first few seconds to mimic the behavior of a benign programs. Therefore, the malicious program has a similar prefetch file to benign programs.

A popular technique to defend against mimicry attack is randomization. Adding randomization to either of feature extractions, feature selections, or detection functions has been shown to improve the malware detector's robustness and resiliency against mimicry attacks in multiple security domains. Randomization reduces the detection function predictability and makes it difficult to anticipate the detection boundary. Accordingly, a malicious program can avoid detection by predicting the outcome of the decision function of the malware detection.

7.1 Randomized Feature Selection

The malware detector uses a simple randomization technique to increase its resilience without affecting its detection accuracy and run-time performance. The technique, called Dropout, is based on randomly removing features during the training process. Thus, the malware detector becomes does not only relay on a small set of features that might be exploited by a malicious program.

Dropout is a popular technique in training large neural networks to reduce overfitting. The goal is to learn hidden patterns without merely memorizing the benign samples in the training data. This improves the robustness of the malware detector and makes it more difficult for mimicry attacks to succeed. After applying truncated SVD during the training, we apply the Dropout technique on the reduced feature vectors. This method does not exhibit any run-time overhead during the detection process because it is only needed during the training process.

To evaluate the technique, a general method to generate evasive malware from the samples may be implemented. The method appends benign traces to malware traces to evade malware detection. While the method uses genetic programming to find the right mutation to succeed, the genetic programming with simple appending operation may be replaced. In each iteration, a benign trace to all the malware traces and measure the decrease in detection accuracy may be appended. Next, the length of the benign trace and repeat the process until the end of the benign trace may be increased. and the same process for a randomly selected subset of benign traces and average the detection scores across them may be applied.

FIG. 9 shows the effect of applying Dropout during the training process. The F1 score may be used because it incorporates True Positive, False Positive, and False Negative metrics. The [2,3]-Grams malware detectors with and without dropout may be considered, and the figure shows that malware detectors trained with dropout are more robust to evasive malware. [2,3]-Grams LR detectors trained with Dropout decrease their detection accuracy more slowly despite adding longer traces of file names from benign prefetch files. The higher order n-grams were more resilient than lower order n-grams. 3-Grams LR detectors were less affected by evasive traces than 2-Grams LR detectors. This experiment showed that a simple randomization technique can help improve the robustness of the malware detector without increasing the problem's complexity or decreasing the run-time performance of the detector.

While the invention has been described with reference to the embodiments above, a person of ordinary skill in the art would understand that various changes or modifications may be made thereto without departing from the scope of the claims.

The invention claimed is:
1. A behavioral malware detection method comprising the steps of:
   extracting features from prefetch files in a computer operating system, wherein prefetch files accelerate computer application launch times by monitoring and adapting to applications usage patterns over time;
   representing a list of dependency file names in the prefetch files using a Bag of Words (BoW) model, wherein the list of dependency file names are the features;
   classifying and detecting benign applications from malicious applications using the BoW model, wherein the classification and detection is done using Bag of Words (BoW) extraction techniques to identify feature vectors of the features that are the list of dependency file names, wherein Singular Value Decomposition (SVD) is applied to extract singular values of the feature vectors in the classification and detection of benign applications and malicious applications;
   quarantining malicious applications based on the detection.

2. The behavioral malware detection method of claim 1, wherein the prefetch files are Microsoft Windows® prefetch files.

3. The behavioral malware detection method of claim 1, wherein the BoW extraction technique supports two different Term Frequency (TF) representations: binary and raw.

4. The behavioral malware detection method of claim 1, wherein classification of benign applications and malicious applications is achieved using Logistic Regression.

5. The behavioral malware detection method of claim 1, wherein the detecting of malware is classified into two classes: the benign class and malicious class.

6. The behavioral malware detection method of claim 1, wherein the classification is performed using Logistic Regression.

7. The behavioral malware detection method of claim 1, wherein the classification updates new families of malicious applications to improve classification.

\* \* \* \* \*